(12) United States Patent
Roy et al.

(10) Patent No.: US 12,118,303 B2
(45) Date of Patent: Oct. 15, 2024

(54) METHOD AND SYSTEM FOR TEXT CLEANING

(71) Applicant: Tata Consultancy Services Limited, Mumbai (IN)

(72) Inventors: Gargi Roy, Kolkata (IN); Lipika Dey, Gurgaon (IN); Mohammad Shakir, Gurgaon (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 356 days.

(21) Appl. No.: 17/474,694

(22) Filed: Sep. 14, 2021

(65) Prior Publication Data
US 2022/0171925 A1 Jun. 2, 2022

(30) Foreign Application Priority Data
Nov. 30, 2020 (IN) .............................. 202021052145

(51) Int. Cl.
*G06F 40/242* (2020.01)
*G06F 18/22* (2023.01)
*G06F 18/2431* (2023.01)
*G06F 40/166* (2020.01)

(52) U.S. Cl.
CPC ............ *G06F 40/242* (2020.01); *G06F 18/22* (2023.01); *G06F 18/2431* (2023.01); *G06F 40/166* (2020.01)

(58) Field of Classification Search
CPC .... G06F 40/242; G06F 40/166; G06F 40/279; G06F 40/232; G06F 40/30; G06F 40/295; G06F 40/35; G06F 40/289; G06F 40/211; G06F 18/22; G06F 18/2431; G06F 16/35; G06F 16/355; G06F 16/367; G06F 16/353; G06F 16/36; G06F 16/3344; G06F 16/951; G06F 16/334; G06F 16/30; G06F 16/313; G10L 15/22; G10L 15/1815; G06N 20/00; G06N 3/08; H04M 3/53333; H04M 3/493
USPC ......................................................... 704/1–9
See application file for complete search history.

(56) References Cited

U.S. PATENT DOCUMENTS

| 8,645,124 | B2 | 2/2014 | Zangvil |
| 9,734,193 | B2 * | 8/2017 | Rhoten ................. G06F 16/243 |
| 2004/0205448 | A1 * | 10/2004 | Grefenstette ....... G06F 16/9535 715/255 |

(Continued)

OTHER PUBLICATIONS

Mohammad et al "Framework for Analyzing and Improving Quality of Available Data for Enterprise Automation Tasks", Proc. Of ACM Conference, Aug. 1, pp. 5 (Year: 2019).*

(Continued)

*Primary Examiner* — Leshui Zhang
(74) *Attorney, Agent, or Firm* — FINNEGAN, HENDERSON, FARABOW, GARRETT & DUNNER LLP

(57) ABSTRACT

State of the art systems used for text processing fail to differentiate between domain terms and noise terms that form a major part of enterprise and social media data. The disclosure herein generally relates to text processing, and, more particularly, to segregating domain words and noise terms from the text. The system processes input data and classifies words as dictionary words and non-dictionary words. The system processes the dictionary words and non-dictionary words and identifies domain terms and noise terms. The system then corrects the words identified as the noise terms.

9 Claims, 10 Drawing Sheets

(56) References Cited

U.S. PATENT DOCUMENTS

2008/0189605 A1* 8/2008 Kay .................. G06F 40/274
                                                    715/257
2019/0266234 A1* 8/2019 Ormerod .................. G06N 3/08

OTHER PUBLICATIONS

Delphine Bernhard, "Multilingual Term Extraction from Domain-specific Corpora Using Morphological Structure", TIMC-IMAG, Institut de l'Ingenierie et de l'Information de Sante, Faculte de Medecine, F-38706 La Tronche cedex, p. 174-174 (Year: 2006).*
Poumay, "Term extraction from domain specific texts," Master of Data Science Thesis, University of Liège, (2019).

* cited by examiner

METHOD AND SYSTEM FOR TEXT CLEANING

PRIORITY CLAIM

This U.S. patent application claims priority under 35 U.S.C. § 119 to: India Application No. 202021052145, filed on Nov. 30, 2020. The entire contents of the aforementioned application are incorporated herein by reference.

TECHNICAL FIELD

The disclosure herein generally relates to data processing, and, more particularly, to a method and system for text cleaning segregating domain words and noise terms from the data.

BACKGROUND

A large part of enterprise data such as customer complaints, project management documents, client communications, risk reports, emails etc. can yield rich insights and actionable intelligence for improving enterprise processes. Text analytics solutions built with machine learning methods may be employed for the purpose. There is also an increasing emphasis on robotic process automation (RPA) where the focus is on automating enterprise tasks. Tasks that do not involve active or deep cognitive abilities can be easily automated. However, a task of reading and interpretating natural language content may be difficult from a process and system point of view, as the natural language content may include non-dictionary terms. Given the volumes of such communication that is generated for any organization in the digital world, automated processing of these content is beneficial to ensure timely response to customers, timely resolution and also generate predictive insights. Social media data has similar structure, that it contains dictionary terms as well as non-dictionary terms. Further, some of the non-dictionary terms in the social media data may be noise terms, whereas the rest may be allowed usage of certain known terms in the social media context, which the state of the art systems may fail to recognize, similar to the case of domain words in the enterprise data context. This problem may be true for other domains as well, which have data having similar characteristics as that of the enterprise data or the social media data.

Quality of analytical results are largely dependent on the quality of input text. Thus, all text analytics solutions are preceded by pre-processing and cleaning steps to help yield better results. Though there exists standard dictionaries to aid text cleaning process, these dictionaries are not enough to deal with enterprise text, due to their inherent nature. Internal enterprise communication like emails, messages etc. contains words, abbreviations and terms that are very domain specific and not available in general purpose thesaurus. This includes terms representing names of services, products or groups etc. They also contain lots of acronyms that are not always standardized but get created along the way and are well understood within a community. Consumer generated content like customer complaints, call logs etc. additionally contain spelling distortions of products and services. The real problem posed by enterprise text is that there is no demarcation between domain words that "appear to be noisy" since they are not part of a dictionary and words that are "true noise" because it is misspelt or misused.

SUMMARY

Embodiments of the present disclosure present technological improvements as solutions to one or more of the above-mentioned technical problems recognized by the inventors in conventional systems. For example, in one embodiment, a processor implemented method of document correction is provided. Data comprising a plurality of words is collected as input data, via one or more hardware processors. The plurality of words are classified to a set of dictionary words (V) and a set of non-dictionary words (N), via the one or more hardware processors. Further, word frequency of each word in V and N determined via the one or more hardware processors, wherein the word frequency of a word represents frequency of occurrence of the word in the input data. The non-dictionary words in N are then segregated as domain terms and noise terms, based on the determined word frequency, via the one or more hardware processors. Further, the plurality of words in V and N are classified into a plurality of pre-defined categories, via the one or more hardware processors, wherein the plurality of pre-defined categories comprises a plurality of error categories and a plurality of non-error categories. Further, correct term for each of a plurality of noise terms in a plurality of noise categories among the plurality of pre-defined categories is determined, to generate corrected term corresponding to each of the plurality of noise terms, via the one or more hardware processors. Then the corrected terms are reclassified, via the one or more hardware processors, wherein the reclassification of the corrected terms involves movement of the corrected terms from one category to another category among the plurality of pre-defined categories. The noise terms in the input data are then replaced with the corresponding corrected terms, via the one or more hardware processors.

In another aspect, a system for document correction is provided. The system includes a memory storing instructions, one or more communication interfaces, and one or more hardware processors coupled to the memory via the one or more communication interfaces. The one or more hardware processors are configured by the instructions to collect data comprising a plurality of words as input data. The plurality of words are classified to a set of dictionary words (V) and a set of non-dictionary words (N), by the system. Further, word frequency of each word in V and N is determined by the system, wherein the word frequency of a word represents frequency of occurrence of the word in the input data. The non-dictionary words in N are then segregated as domain terms and noise terms, based on the determined word frequency, by the system. Further, the plurality of words in V and N are classified into a plurality of pre-defined categories, wherein the plurality of pre-defined categories comprises a plurality of error categories and a plurality of non-error categories. Further, correct term for each of a plurality of noise terms in a plurality of noise categories among the plurality of pre-defined categories is determined, to generate corrected term corresponding to each of the plurality of noise terms. Then the corrected terms are reclassified, wherein the reclassification of the corrected terms involves movement of the corrected terms from one category to another category among the plurality of pre-defined categories. The noise terms in the input data are then replaced with the corresponding corrected terms, by the system.

In yet another aspect, a non-transitory computer readable medium for document correction is provided. The non-transitory computer readable medium includes a plurality of instructions which when executed, cause one or more hardware processors to perform the following steps to perform the document correction. Initially, data comprising a plurality of words is collected as input data, via one or more hardware processors. The plurality of words are classified to a set of dictionary words (V) and a set of non-dictionary words (N), via the one or more hardware processors. Further, word frequency of each word in V and N is determined via the one or more hardware processors, wherein the word frequency of a word represents frequency of occurrence of the word in the input data. The non-dictionary words in N are then segregated as domain terms and noise terms, based on the determined word frequency, via the one or more hardware processors. Further, the plurality of words in V and N are classified into a plurality of pre-defined categories, via the one or more hardware processors, wherein the plurality of pre-defined categories comprises a plurality of error categories and a plurality of non-error categories. Further, correct term for each of a plurality of noise terms in a plurality of noise categories among the plurality of pre-defined categories is determined, to generate corrected term corresponding to each of the plurality of noise terms, via the one or more hardware processors. Then the corrected terms are reclassified, via the one or more hardware processors, wherein the reclassification of the corrected terms involves movement of the corrected terms from one category to another category among the plurality of pre-defined categories. The noise terms in the input data are then replaced with the corresponding corrected terms, via the one or more hardware processors.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
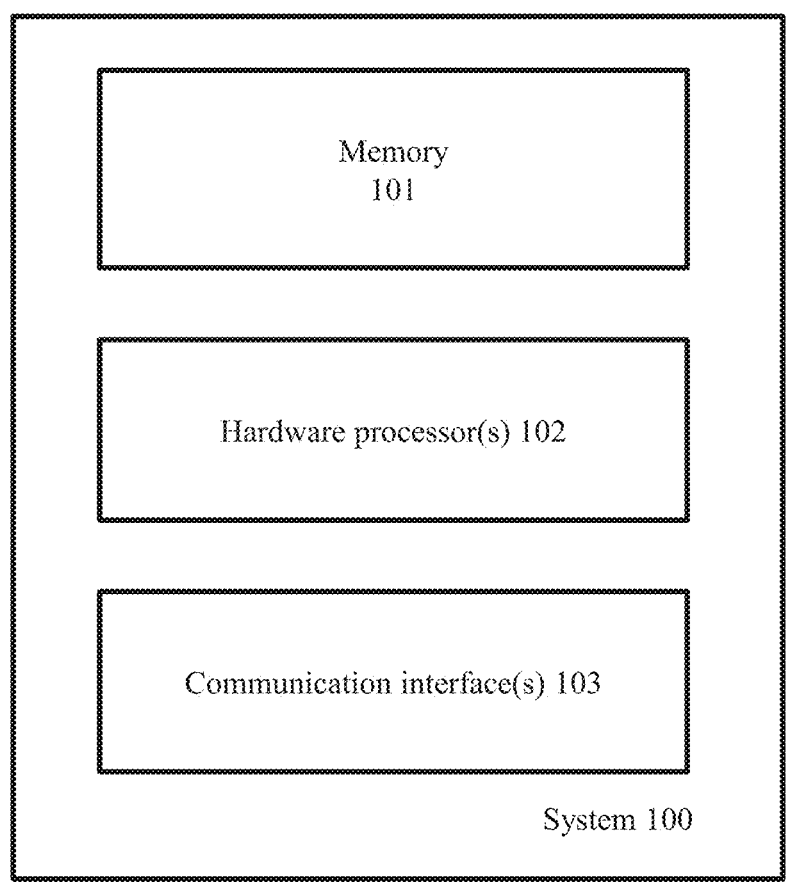
FIG. 1 illustrates an exemplary system for cleaning data, according to some embodiments of the present disclosure.

In an embodiment, it is to be noted that working of system 100 is explained by giving reference and by citing examples from enterprise data processing and cleaning. However, the system 100 may be used for processing data from any other domain, in which data have similar characteristics (as covered in the foregoing description) as that of the enterprise data. An example of such data is social media data. Also, the terms 'text' and 'data' are used interchangeably throughout the claims and specification.

For any cleaning to be done for enterprise text, it has to be first resolved whether the unrecognizable term is an enterprise term or a true noise term and then correct it appropriately. Similar problem exists in other domains as well. For example, social media data. Communication in the social media context is very informal that a text corpus generated from the social media communication contains informal/non-dictionary terms. In addition to spelling mistakes and typos, such text may contain distortion of traditional words and phrases while writing them down. There is also deliberate digital smudging of words to avoid online detection. This is one of the problems faced by online hate speech detectors. Hence detecting and replacing these words with the correct word is an important problem in that scenario also.

For example, consider that a certain repository refers often to the name "Flipkart." This is a non-dictionary term, but may be recognized as a Named Entity if written correctly in a text. However, in customer communications involving the organization, this term may be wrongly mention the term as "fipkart", "flipcart", "flipcardt" and so on, which, a state of the art system may fail to recognize as erroneous mentions of the name. This adversely affects performance of many of the state of the art text analytics solutions.

In another example, during analysis of communication in a financial domain it was found that the term "account" is wrongly written as accont, acnt, act and so on, by many users. While the last two are abbreviated references, the first one is a typo. A standard spell-correction algorithm employing shortest edit-distance based correction corrects "accont" as "accost", which is wrong, as the system failed to consider context in which the term was used.

In another example, a scenario in which there is no error, but only an "apparent error" introduced by enterprise terms is considered. In a particular repository, a term called "gess" appears very often. "gess" may be an internal term for an organization, referring to a particular service, and there may be multiple references to this term in the company's internal text repository. A state of the art spell checker would tend to correct this term to "guess", which would be incorrect.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 1 through FIG. 6D, where similar reference characters denote corresponding features consistently throughout the figures, there are shown preferred embodiments and these embodiments are described in the context of the following exemplary system and/or method.

FIG. 1 illustrates an exemplary system for cleaning data, according to some embodiments of the present disclosure. The system 100 includes one or more hardware processors 102, communication interface(s) or input/output (I/O) interface(s) 103, and one or more data storage devices or memory 101 operatively coupled to the one or more hardware processors 102. The one or more hardware processors 102 can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The communication interface(s) 103 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the communication interface(s) 103 can include one or more ports for connecting a number of devices to one another or to another server.

The memory 101 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more components (not shown) of the system 100 can be stored in the memory 101. The memory 101 is configured to store a plurality of operational instructions (or 'instructions') which when executed cause one or more of the hardware processor(s) 102 to perform various actions associated with the text processing and cleaning being performed by the system 100. The system 100 can be implemented in a variety of ways as per requirements. Various steps involved in the process of the text processing and cleaning being performed by the system 100 are explained with description of FIGS. 2 through 5. All the steps in FIGS. 2 through 5 are explained with reference to the system of FIG. 1 and the components of the system of FIG. 1.

Figure 2A:
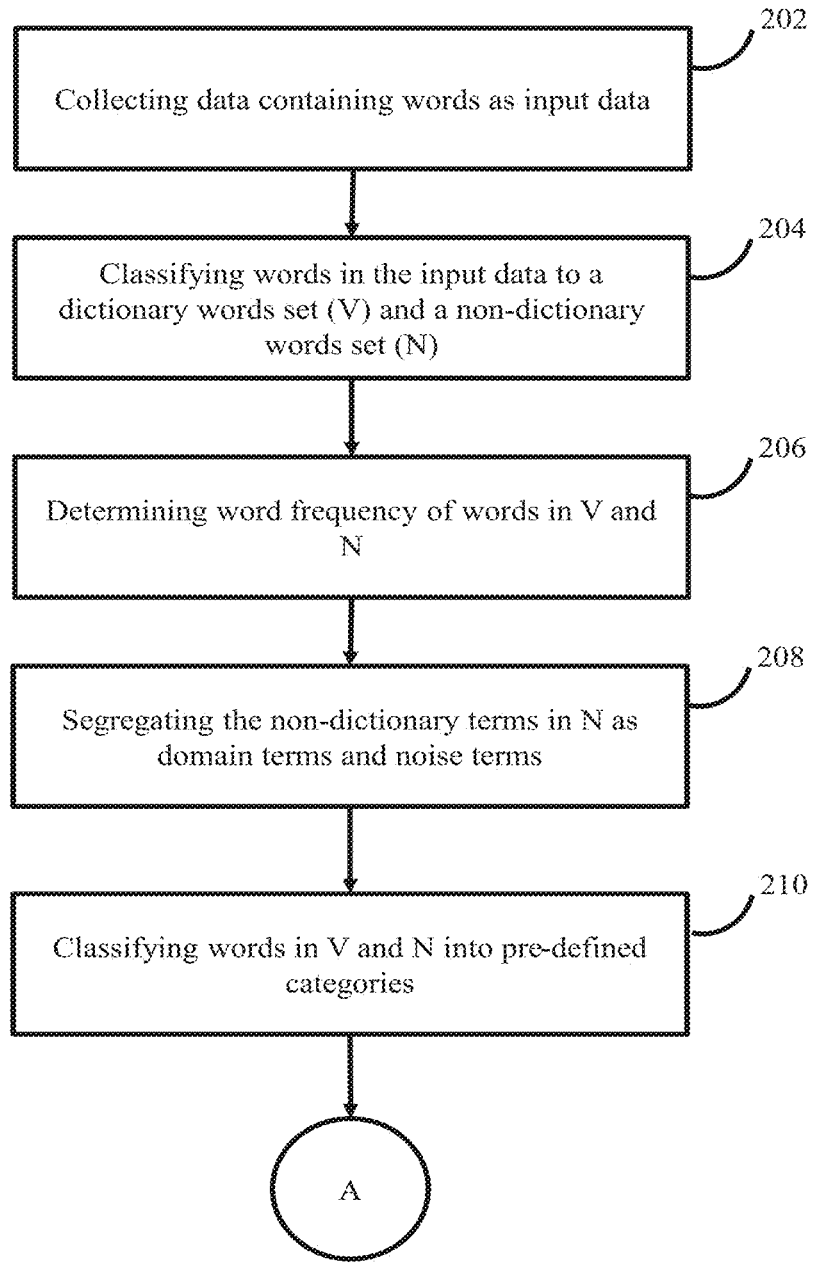
FIGS. 2A and 2B (collectively referred to as FIG. 2) is a flow diagram depicting steps involved in the process of cleaning the data, using the system of FIG. 1, according to some embodiments of the present disclosure.
Figure 2B:
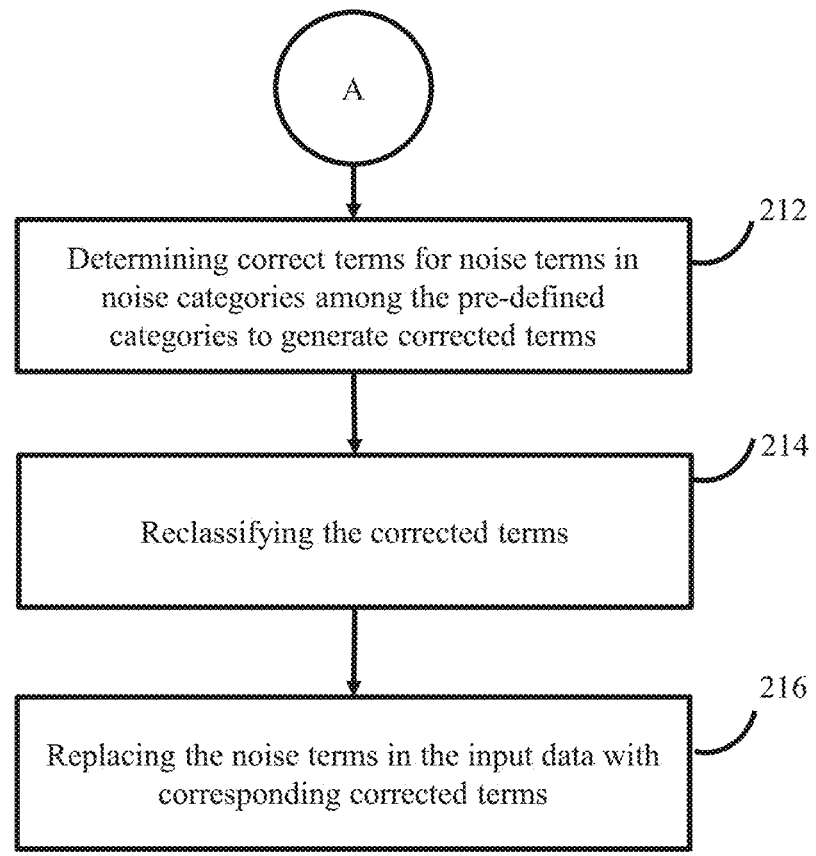

FIGS. 2A and 2B (collectively referred to as FIG. 2) is a flow diagram depicting steps involved in the process of cleaning the data collected as input data, according to some embodiments of the present disclosure.

At step 202, the system 100 collects enterprise data (alternately referred to as 'input data') as input. The input data contains dictionary terms as well as non-dictionary terms.

The system 100 processes the input data and at step 204, words in the input data are classified as dictionary terms and non-dictionary terms. The system 100 may use any suitable technique for classifying the words as the dictionary terms and non-dictionary terms. For example, a standard dictionary processing method may be used by the system 100. Words that have been identified as the dictionary words are added into a set of dictionary words (V), and the words that have been identified as the non-dictionary words are added into a set of non-dictionary words (N).

At step 206 of the process 200, the system 100 determines word frequency of each of the words in V and N. Word frequency of a word indicates/represents frequency of occurrence of the word in the input data. The system 100 may use any known word counting techniques for counting the number of occurrences of each of the words, in the input data, and thereby determine the word frequency. Based on the determined word frequency, the system 100 may assign each of the plurality of words to corresponding frequency class. For a word $\omega$, corresponding class is denoted as $\omega_i^S$, where S takes value V or N depending on parent set of $\omega$, and i denotes a class number.

Figure 3:
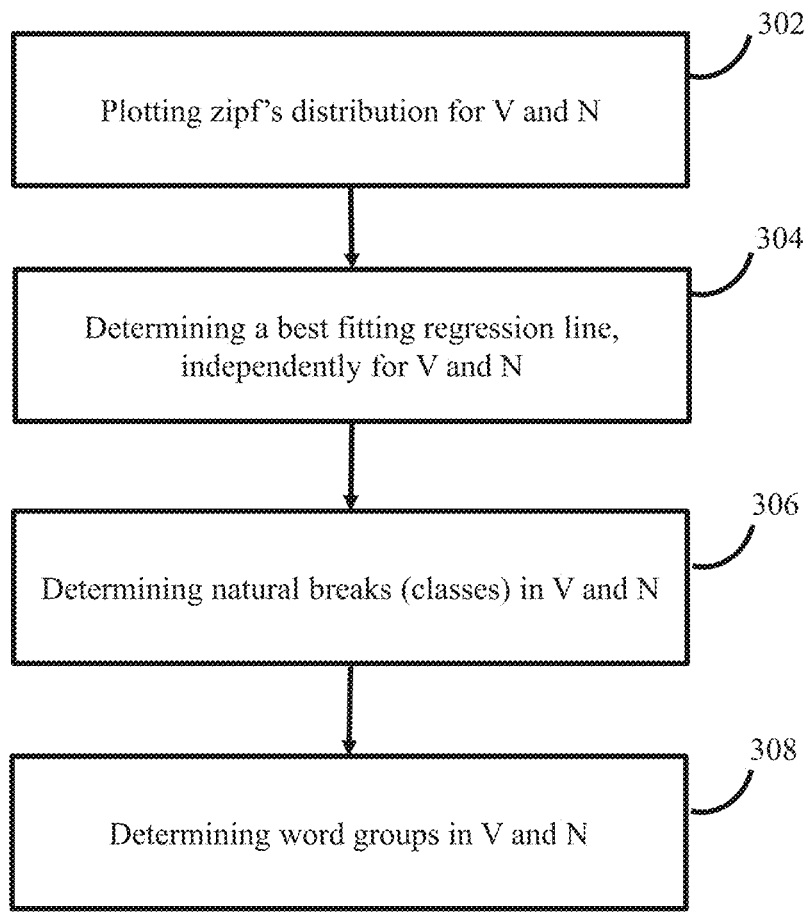
FIG. 3 illustrates a flow diagram depicting steps involved in the process of segregating the non-dictionary words in a set of Non-dictionary terms (N) as the domain terms and noise terms, using the system of FIG. 1, in accordance with some embodiments of the present disclosure.
Figure 6A:
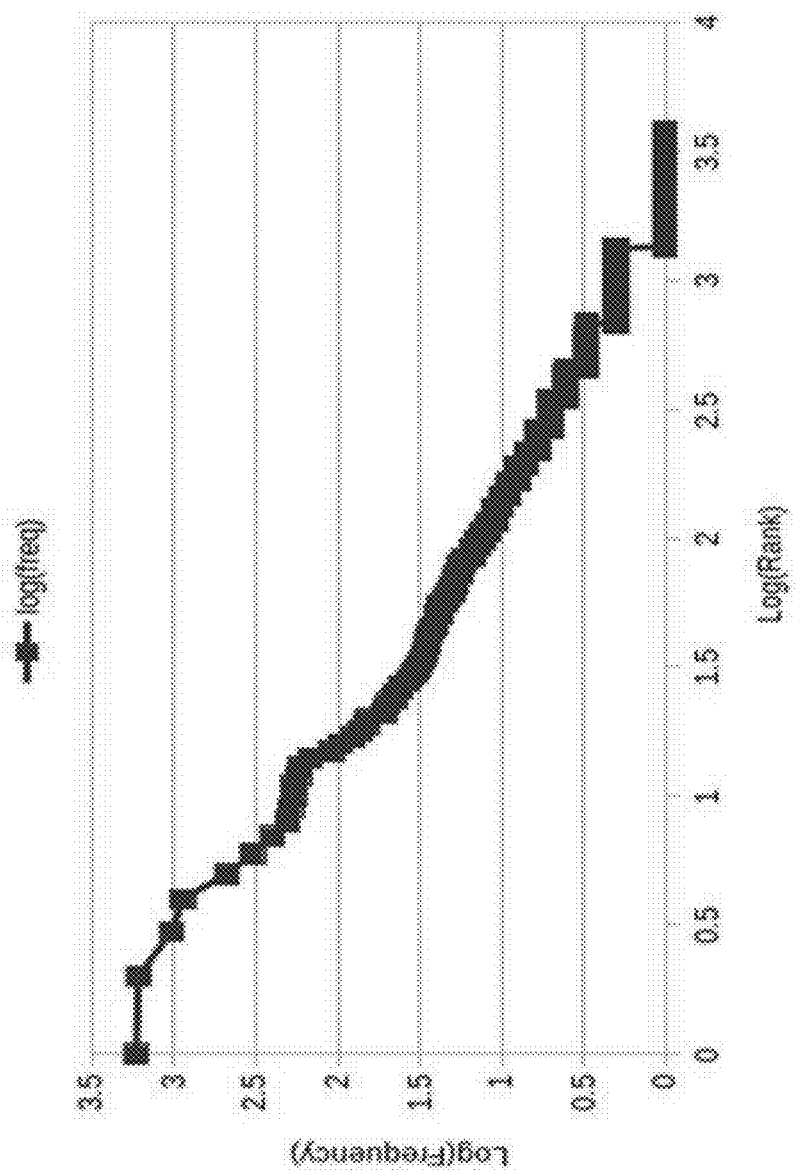
FIGS. 6A through 6D are example distributions plotted by the system of FIG. 1 during the data processing, in accordance with some embodiments of the present disclosure.
Figure 6B:
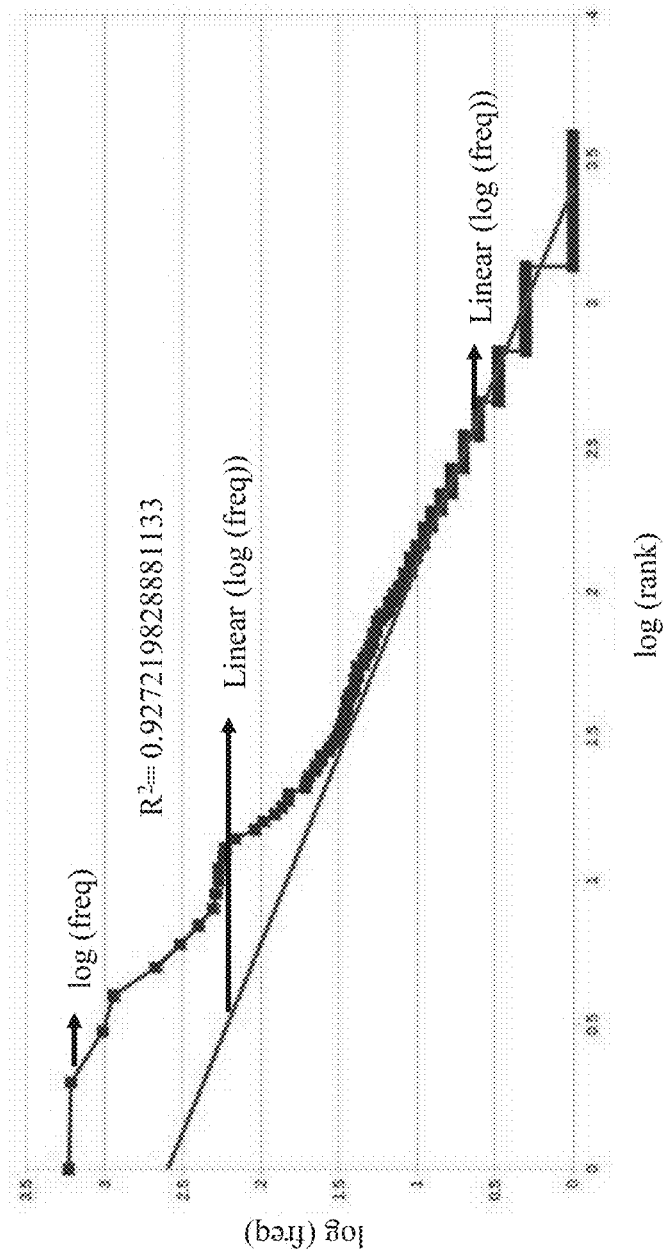
Figure 6C:
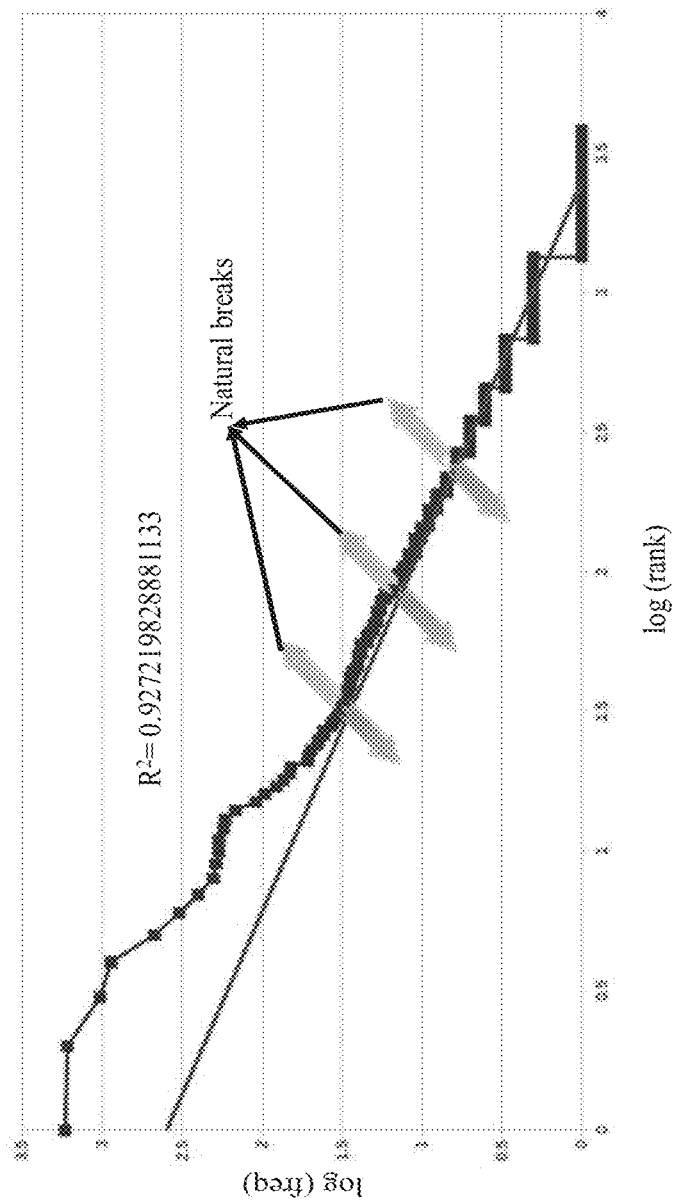
Figure 6D:
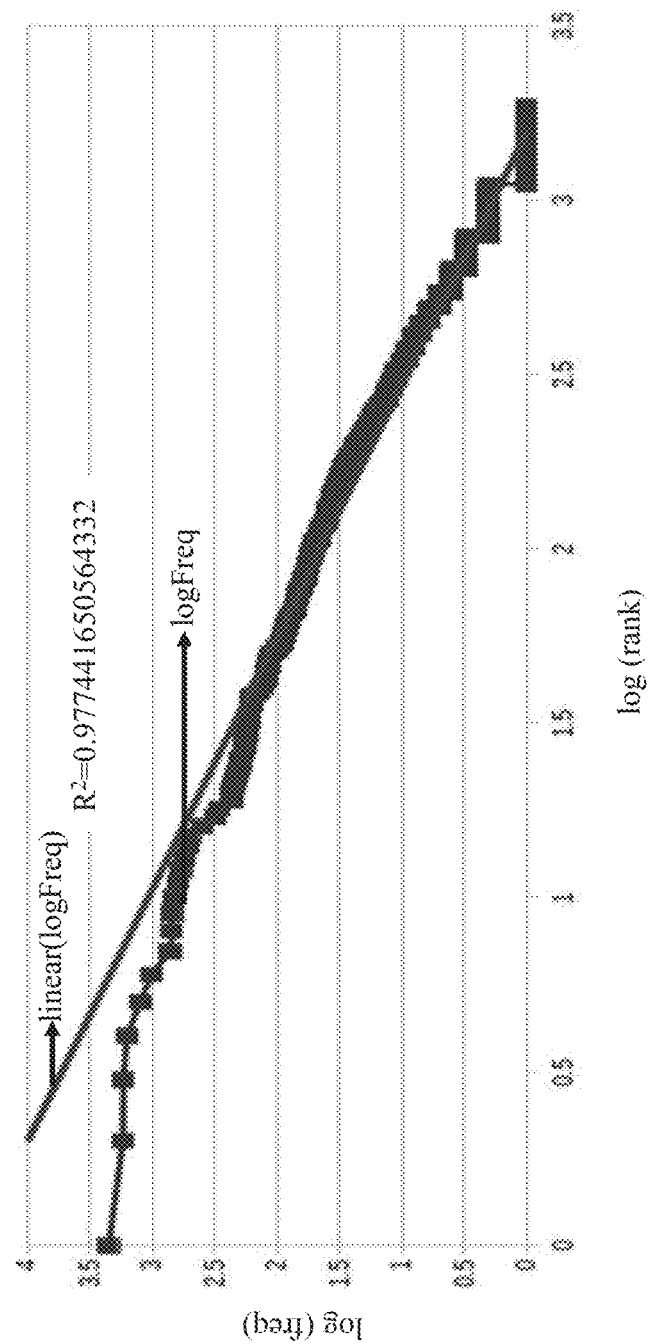

The non-dictionary terms in N contain domain terms as well as noise terms (also referred to as 'true noise term/data'). At step 208, the system 100 segregates the noise terms and domain terms from N. Steps involved in the process of segregating the noise terms and domain terms from N are depicted in FIG. 3. In this process, at step 302, the system 100 plots zipf's distribution separately for V and N, wherein the zipf's distribution is plotted using log-log scale of rank $\omega_r$ versus frequency $\omega_f$ of each word in V and N. An example of the zipf's distribution plotted by the system 100, for non-dictionary words in finance domain, is depicted in FIG. 6A. Another example, which shows the zipf's distribution plotted by the system 100, for dictionary words from the finance domain, is depicted in FIG. 6D. At step 304, the system 100 applies a linear regression minimizing standard error, such that a best fitting line/regression line/best fitting regression line is determined separately for distribution of V and N. An example of application of the linear regression to identify the best fitting line is depicted in FIG. 6B.

By applying the Jenk's optimization on standard error between the regression line and the original frequency curve, at step 306, the system 100 determines a plurality of Jenk's natural breaks/classes. The Jenk's natural breaks allow the system 100 to interpret role of each of the plurality of words in the input data. Example of determining the Jenk's natural breaks is depicted in FIG. 6C. While applying the Jenk's optimization, the system 100 assigns an initial value (for example, the initial value may be 2) for for a class number, and after grouping the words, checks a Goodness of Variance Fit (GVF). The value of GVF typically ranges from to 1, where value '1' indicates 'Perfect fit' and value '0' indicates 'No fit'. Value of GVF may be denoted by $\eta$, and value of $\eta$ is used by the system 100 to terminate the Jenk's optimization process with optimal number of classes within a specified error limit. The system 100 iteratively increases value of the class number and applies the Jenk's optimization, till the specified error limit is crossed.

Further, at step 308, the system 100 determines natural groups of words (word groups) in V and N, such that all words in a group are likely to belong to same error category, which in turn means that the words in same group have similar distribution. This in turn represents/indicates similarity of words in the input data. The system 100 then determines a plurality of natural breaks in V and N, by applying Jenks optimization on a standard error between the regression line and an original frequency curve of V and N. The natural breaks/classes determined at step 306 are used by the system 100 to perform grouping of the words. Even though working of the system 100 is explained by referring to Jenk's optimization, in an alternate embodiment the system 100 may use any other suitable optimization technique. The Jenk's optimization technique, when applied, divides a set of values into groups/classes, such that intra-class variance is minimized while maximizing inter-class variance.

The system 100 is configured to assign an identity '1' for a class associated to highest frequency side of the regression line. As a result, a word belonging to Jenk's class i appears with higher value of word frequency than a word belonging to class i+1.

Figure 5:
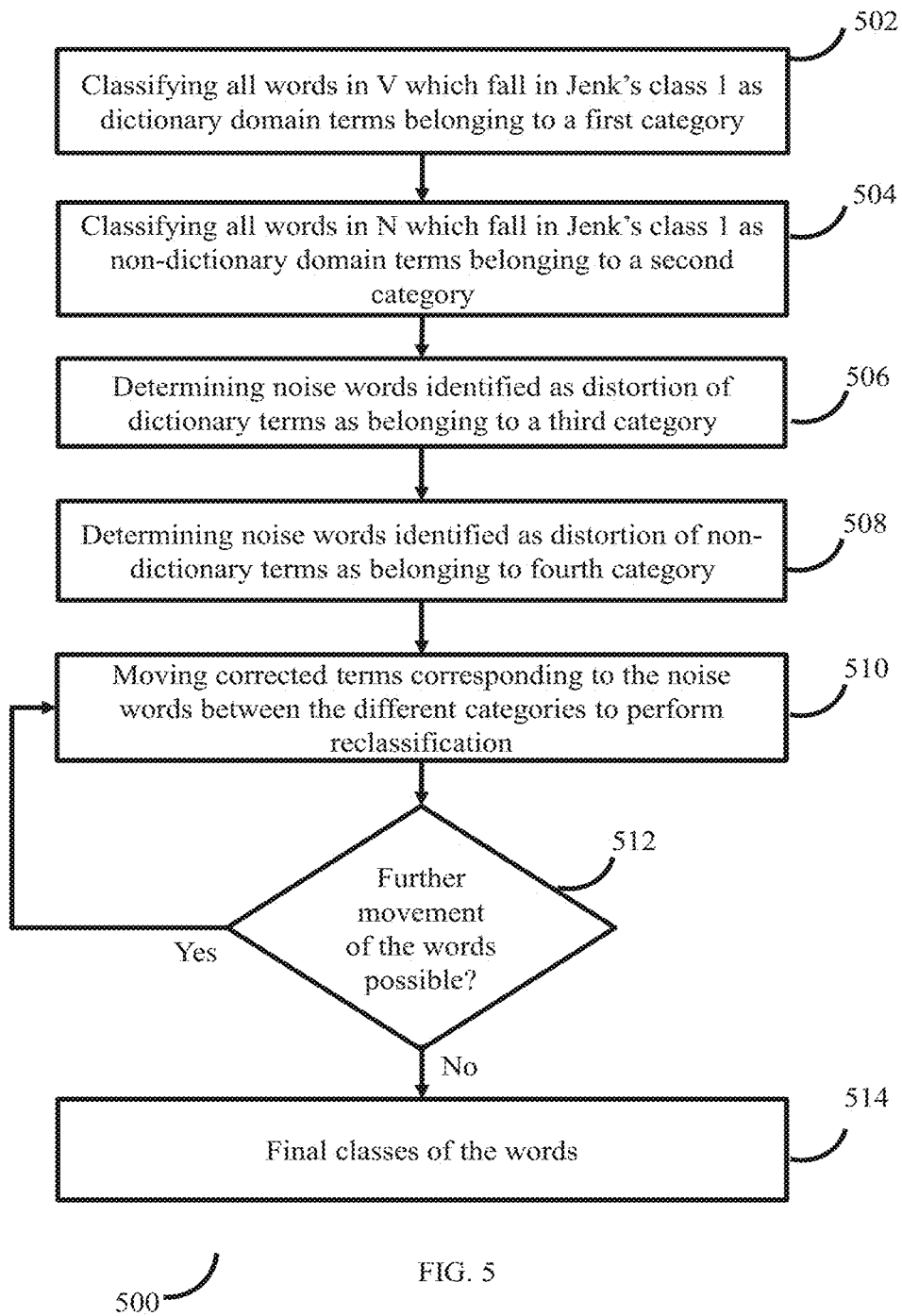
FIG. 5 is a flow diagram depicting steps involved in the process of classifying words in input data to a plurality of categories, using the system of FIG. 1, in accordance with some embodiments of the present disclosure.

At step 210, the system 100 classifies the words in V and N into a plurality of categories, based on identified nature of each of the terms. In an embodiment, the plurality of categories are pre-defined and configured with the system 100. Various steps involved in the process of classifying the words in V and N into the plurality of categories are depicted in FIG. 5. In this process, at step 502, the system 100 classifying all words in V which fall in Jenk's class 1 as dictionary domain terms belonging to a first category. The first category is category of Dictionary Domain Terms, and is denoted by D'. At step 504, the system 100 classifies all words in N, which fall in Jenk's class 1 as non-dictionary domain terms belonging to a second category, and the second category is denoted as D". At step 506, all noise terms which have been identified as distortion of a dictionary term are in a third category, and the third category is denoted as E'. Further, at step 508, all noise terms which have been identified as distortion of non-dictionary terms are in a fourth category, and the fourth category is denoted as E".

The system 100 then determines correct term for each of a plurality of noise terms in a plurality of noise categories (i.e. E' and E") among the plurality of pre-defined categories, to generate corrected term corresponding to each of the plurality of noise terms. Further, at step 510, the system 100 reclassifies the corrected terms, wherein the reclassification of the corrected terms involves movement of the corrected terms from one category to another category among the plurality of pre-defined categories. The process of reclassification is iterated till no further movement of the words is possible between the categories. Once all the choices of movement of the words between the different categories is exhausted, final classes are obtained at step 514. The system 100 may then replaces the noise terms in the enterprise data with the corresponding corrected terms.

The process of reclassification as done by the system 100 is explained below:

The system 100 detects the domain words from N by performing the following steps. For each word $\omega_i \in N$, phonetic representation $ph(\omega_i)$ is compared with phonetic representation of dictionary words in V. Let $V_m \subseteq V$ such that each word $\omega_j \in V_m$ satisfy the following properties: a) $\omega_i$ and $\omega_j$ have exactly similar phonetic representation, b) $JW(\omega_i, \omega_j) > \alpha_1$ and $Sim(\omega_i^c, \omega_j^c) > \alpha_2$, where $\alpha_1$ and $\alpha_2$ are user controlled parameters. The system 100 then selects a word $\omega_j$ in $V_m$, which has highest frequency, as a candidate correction term. If word frequency of the word $\omega_j$ is higher than the word frequency of $\omega_i$, then the system 100 determines $\omega_i$ as wrongly spelt occurrence of $\omega_j$.

If $\omega_j$ has lower word frequency than $\omega_i$, then $\omega_i$ may be a domain word. To verify whether $\omega_i$ is a domain word, the system 100 uses information on the word frequencies and Jenk's class numbers determined of $\omega_i$ and $\omega_j$. The system 100 may also check contextual similarities of the words $\omega_i$ and $\omega_j$ for this purpose.

As the word frequencies and Jenk's class numbers have different orders of magnitude, relative difference of frequency and class numbers are determined using equations (1) and (2).

$$d_s = \sigma\left(\ln\left(\frac{\max\{\omega_i^s, \omega_j^s\} - \min\{\omega_i^s, \omega_j^s\}}{\min\{\omega_i^s, \omega_j^s\}}\right)\right), \text{ where } \sigma(x) = \frac{e^x}{e^x + 1} \quad (1)$$

$$d_l = \sigma(\log_{10}(\max\{\omega_i^f, \omega_j^f\}) - \log_{10}(\min\{\omega_i^f, \omega_j^f\})), \quad (2)$$

$$\text{where } \sigma(x) = \frac{e^x}{e^x + 1}$$

Where, $\omega_i^s$, $\omega_i^f$ denote class number and frequency of word $\omega_i$ $\max\{x,y\}$ and $\min\{x,y\}$ return maximum and minimum of $\{x,y\}$ respectively In equation (2), logarithm to the base 10 is used to represent large range of values in a compact way and also to capture multiplicity of large number with respect to small number If values of $d_s$ and $d_l$ are higher than a first threshold value, then possibility of $\omega_i$ and $\omega_j$ being same word is less. If $d_l$ is higher than the first threshold value, then the system 100 determines that $\omega_i$ is a domain word, and moves $\omega_i$ to D". For example, a domain term GESS is phonetically similar to the word "guess". However, in the enterprise text, the domain term GESS may have higher frequency and rank as compared to the dictionary term 'guess', and needs to be retained in the enterprise text without any correction.

If difference in relative frequencies between $\omega_i$ and $w_j$ is lower than the first threshold value, then the system 100 checks value of $d_s$ along cosine similarity between the word vector representations $Sim(\omega_i^v, \omega_j^v)$. If $d_S$ exceeds a second threshold $\theta_2$, and $Sim(\omega_i^v, w_j^v) \leq \theta_3$, where $\theta_3$ is a third threshold, then the system 100 determines that $\omega_i$ is a domain term. The class number of a word captures relative significance of the word in the enterprise data, independent of the actual frequency values. This value is used to control the movement of unknown words in a cautious fashion by imposing the following restriction—an unknown or error word which has a higher class in N is not allowed to move to a lower class in V indiscriminately. The system 100 further considers contextual similarity established by cosine similarity of word vectors, since neighbors of a word are taken into consideration while constructing the embeddings. Similarly, occurrences of terms like STURCTURE which is a very common typo for the intended term STRUCTURE are corrected at this stage since both the terms have same phonetic representation and also a substantial overlap in their context.

The system 100 represents non-dictionary words as key sorted balanced binary search tree, by considering phonetic representation string of the words. The system 100 then groups all words having matching phonemes in first two positions and obtains a plurality of sub-trees. Further, for each of the groups, the system 100 computes a pair-wise Jaro-wrinkler distance between the words as well as between phonetic representations of the words, and cosine similarities of their character and word vector representations. The system 100 then considers words having similarity exceeding a threshold, as altered representations of each other. If any word in a group is identified as representing a word which is already identified as a noisy representation of a dictionary word, the system 100 considers all words in the group as noise with correction.

Figure 4:
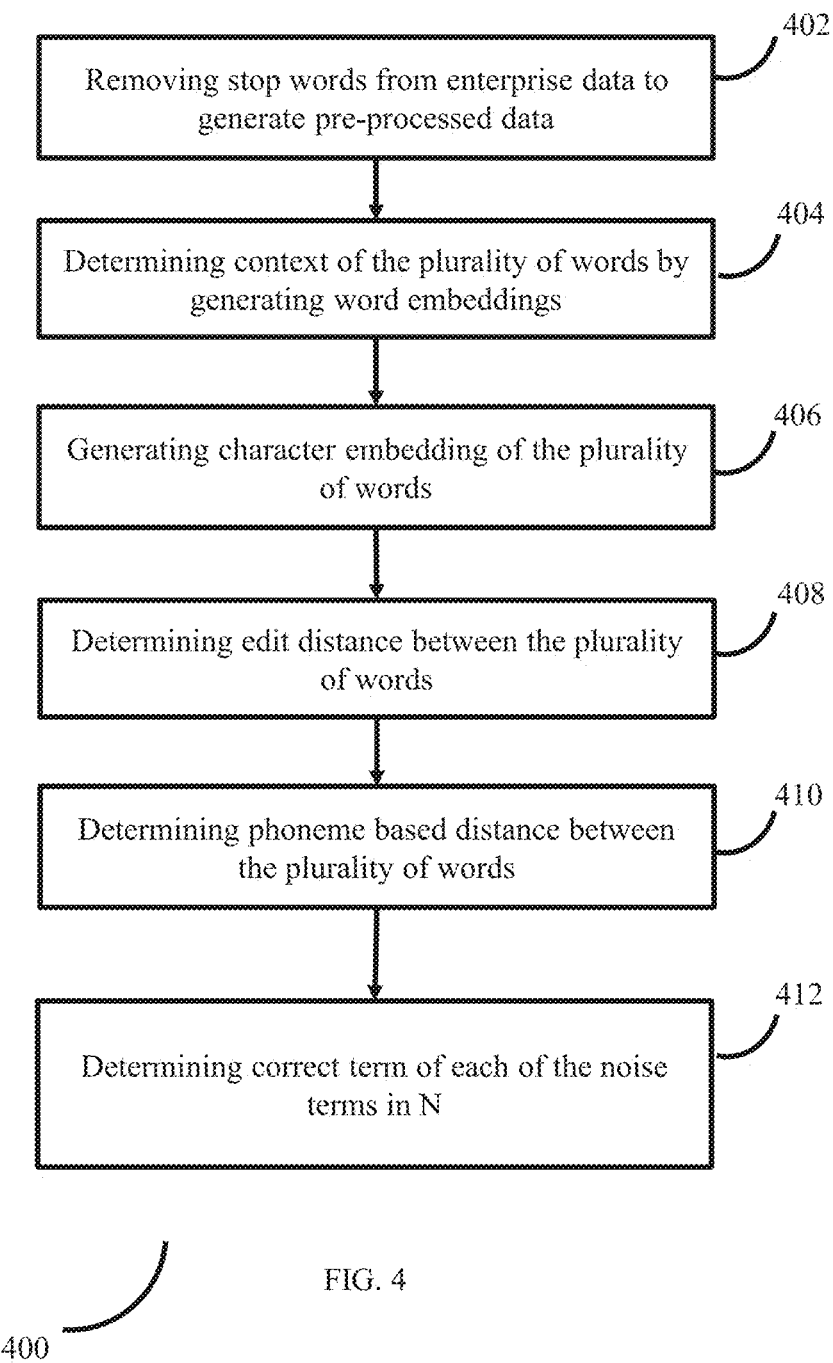
FIG. 4 is a flow diagram depicting steps involved in the process of determining the correct term for each of the plurality of noise terms, using the system of FIG. 1, according to some embodiments of the present disclosure.

For remaining non-empty subsets that have cardinality greater than 2, the system 100 generates frequency distribution of the words within the subset tests for anomaly detection using an appropriate technique. For example, the system 100 may use Grubbs' test for this purpose. If using the Grubb's test the system 100 detects that a word having highest frequency is an anomaly, then the system 100 determines the word as a domain term and is moved to D", and considers other terms as erroneous representations of the word and are moved to E". For subsets with two elements, the system 100 applies equation (2) which computes relative difference between the frequencies with threshold which may be set to a pre-defined value (for example, 0.75), and executes the aforementioned steps to decide whether a term is a domain term, and if the term is a domain term, the system moves the term to D". The system 100 keeps remaining terms as it is in N since no correction can be suggested for it. For example, "screenshot" is a commonly encountered term in all enterprise repositories, and is not a dictionary word. A few example variations of "screenshot" are screesnhot, screenhot, scrrenshot and so on. Such variations are corrected at this step. Various steps involved in the process of making such corrections to generate corrected terms for noise terms in V are depicted in FIG. 4.

At step 402, the system 100 pre-processes the input data by removing all stop words, to generate pre-processed data. Further, at step 404, the system 100 generates word embeddings for each word in the pre-processed data, and uses the word embeddings to determine context of each of the words. The system 100 may use any suitable technique for generating the word embeddings of the words. The word embeddings generated for a word ω is denoted as ω". At this step, the system 100 may use an approach that may work well with small data and can represent rare terms. An example of techniques that may be used for generating the word embeddings is word2vec. The system 100 may be configured to select window size and vector dimension based on requirements.

At step 406, the system 100 generates character embeddings of the words. The system 100 uses the character embeddings to recognize new words that have partial overlap with known words. The character embeddings help recognize different lemmatizations of same form, and different entities of same type, by recognizing particular suffix, prefix and so on. The system 100 may use any known suitable technique/algorithm to generate the character embeddings. An example of such techniques is Chars2vec. Appropriate vector dimensions may be selected and used, based on requirements. The character embeddings are represented as At step 408, the system 100 determines edit distance between the plurality of words, using one or more appropriate methodologies. At step 410, the system 100 determines phoneme based distance between the plurality of words, using one or more appropriate methodologies.

Further, at step 412, the system 100 determines correct term for each of the noise terms in N, as a function of cosine similarity of the word embeddings, the character embedding, the determined edit distance, and the determined phoneme based distance. The corrected terms which are generated by determining the correct terms for the noise terms in the noise categories also are moved to D' or D" by the system 100.

After reclassifying the corrected terms at step 214, at step 216, the system 100 corrects the enterprise data by replacing the noise terms with the corrected terms. After correcting the input data, i.e. after replacing all the noise terms with corresponding corrected terms, the system 100 again segregates data corpus of the input data with the corrected data to dictionary terms and non-dictionary terms. Further the system 100 generates Jenk's classes for the set of dictionary terms and the set of non-dictionary terms. Further, words that belong to n number of highest ranked classes of set of dictionary terms and the set of non-dictionary terms are determined as the domain terms.

In various embodiments, steps in method 200 may be performed in the same order as depicted in FIG. 2 or in any alternate order that is technically feasible.

Experimental Results

Data selected for experiments were arranged in different datasets. Dataset 1 to dataset 7 stored internal enterprise data that belonged to different domains such as risk, contingency, finance, banking, and HR. These data sets contain internal organizational mails, communications, customer complaints, customer requests, and so on. Other five data sets used during the experiment are as follows. i) Dataset 8: This data set (Weissenbacher et al., 2018) contained tweets mentioning different drug names, and their side effects. ii) Dataset 9: This data set contained customer complaints with multi-label annotation in telecom domain (Dasgupta et al., 2016). The complaints were generated within India. Dataset 10: This Offensive Language Identification Dataset (OLID) (Zampieri et al., 2019) contained annotated offensive social media content. iii) Dataset 11: This data set (Davidson et al., 2017) contained tweets with racist, sexist, homophobic and offensive content. Although this dataset contained annotations, these annotations were not considered during the experiment. iv) Dataset 12: This dataset (de Gibert et al., 2018) contained posts extracted from Stormfront, a white supremacist forum. This data set also was annotated, however, and during the experiments, the texts which were annotated as hate speech. Of the above, data sets 5, 6, 7, 9 and 10 were labeled. For these datasets, results for classification before and after cleaning are provided. Classification was done using a Gradient Boosting classifier. Dataset 9 was multi-labeled, hence was classified using a Multilabel k Nearest Neighbors classifier. Classification results are presented using accuracy, precision, recall and F1-Scores.

Performance Evaluation:—

Dataset
Domain
of documents
Corpus tokens
Unique non-dictionary terms
detected                              Domain
correct                               dictionary terms
Resolved                              Error terms
Domain terms
Misspelling of
dictionary terms
Misspelling of non-
dictionary terms

TABLE 1

| Data Set | Domain | # of documents | Corpus Tokens | Unique Non-Dictionary Terms | Domain Dictionary Terms Detected | Correct(%) | Error Terms Resolved | Domain Terms Detected | Correct(%) | Misspelling of Dictionary Terms Detected | Correct(%) | Misspelling of NonDictionary Terms Detected | Correct(%) |
|---|---|---|---|---|---|---|---|---|---|---|---|---|---|
| 1 | Risk | 9942 | 7211 | 3022 | 27 | 27(100%) | 1457 | 565 | 546(97%) | 760 | 636(84%) | 132 | 124(94%) |
| 2 | Contigency | 9942 | 6640 | 2525 | 142 | 139(98%) | 106 | 505 | 495(98%) | 481 | 438(91%) | 81 | 74(91%) |
| 3 | Risk | 9387 | 5251 | 1934 | 100 | 100(100%) | 746 | 317 | 303(96%) | 387 | 367(95%) | 42 | 32(76%) |

TABLE 1-continued

| Data Set | Domain | # of documents | Corpus Tokens | Unique Non-Dictionary Terms | Domain Dictionary Terms Detected | Correct(%) | Resolved | Error Terms Domain Terms Detected | Correct(%) | Misspelling of Dictionary Terms Detected | Correct(%) | Misspelling of NonDictionary Terms Detected | Correct(%) |
|---|---|---|---|---|---|---|---|---|---|---|---|---|---|
| 4 | Contigency | 9387 | 5448 | 1965 | 165 | 165(100%) | 626 | 240 | 233(97%) | 353 | 325(92%) | 33 | 29(88%) |
| 5 | Finance | 2147 | 5865 | 3967 | 29 | 29(100%) | 1092 | 447 | 430(96%) | 427 | 316(74%) | 218 | 158(73%) |
| 6 | Banking | 2360 | 6843 | 4122 | 41 | 41(100%) | 766 | 137 | 131(96%) | 431 | 356(83%) | 198 | 135(68%) |
| 7 | HR | 16357 | 12201 | 7309 | 67 | 67(100%) | 3272 | 381 | 369(97%) | 2261 | 1884(84%) | 630 | 339(62%) |
| 8 | Twitter | 5383 | 10766 | 5192 | 1157 | 1130(98%) | 370 | 150 | 143(95%) | 220 | 170(77%) | — | — |
| 9 | Telecom | 5394 | 17263 | 10009 | 130 | 129(99%) | 4102 | 255 | 236(93%) | 3105 | 2403(77%) | 772 | 567(73%) |
| 10 | Offensive | 13241 | 17784 | 5973 | 225 | 225(100%) | 619 | 287 | 266(93%) | 243 | 217(89%) | 89 | 75(84%) |
| 11 | Hate tweet | 24783 | 32552 | 21228 | 505 | 498(99%) | 5701 | 2208 | 1933(88%) | 2718 | 236(91%) | 775 | 719(93%) |
| 12 | Hate post | 958 | 3382 | 588 | 598 | 597(100%) | 179 | 144 | 135(94%) | 35 | 29(83%) | — | — |

During the experiment, error correction results were manually evaluated for subsets of words for all the 12 data sets and the performance of the system 100 is represented in Table 1. As example, only a few values have been depicted in Table. 1. Table. 1 shows that the precision of correction is very high at around 90%. Analysis showed that most of the unresolved error words are names of people and places, land marks and house/building names etc. in signature. These usually have very low frequencies and high variance. Table 2 shows classification performance (before and after cleaning) showing that performance of the system 100 is enhanced (around 3-13%) after cleaning.

TABLE 2

| Accuracy | F1-Score | Recall | Precision | Performance | | |
|---|---|---|---|---|---|---|
| 0.927 | 0.923 | 0.922 | 0.924 | Raw | Dataset 5 | Multi class |
| 0.96 | 0.96 | 0.96 | 0.96 | clean | | |
| 0.444 | 0.421 | 0.418 | 0.425 | raw | Dataset 6 | |
| 0.48 | 0.48 | 0.47 | 0.5 | clean | | |
| 0.855 | 0.863 | 0.849 | 0.878 | raw | Dataset 7 | |
| 0.89 | 0.88 | 0.87 | 0.89 | clean | | |
| 0.75 | 0.7 | 0.63 | 0.79 | raw | Dataset 10 | |
| 0.77 | 0.72 | 0.66 | 0.8 | clean | | |
| 0.44 | 0.409 | 0.32 | 0.54 | raw | Dataset 9 | Multi-label |
| 0.46 | 0.46 | 0.38 | 0.58 | Clean | | |

Using the same approach, the system 100 can process and identify distortions associated with slang terms which may be present in hate speech data (dataset 11). In hate speech, such slang terms may be purposefully distorted to avoid automatic detection by word-based filters. Experiments conducted proved that the system 100 is able to The results indicate that the system 100 is able to detect these types of distortions well. Hence this approach can be more effective in detecting such terms from social media.

Table. 3 depicts some distortions/errors from social media data which were identified as noise terms and corresponding corrected terms, identified by the system 100.

TABLE 3

| Social media error | Corrected term |
|---|---|
| Snapchatt | snapchat |
| snapchats | snapchat |
| Ebloa | ebola |
| lmaoooo | lmao |
| Lmfao | lmao |

TABLE 3-continued

| Social media error | Corrected term |
|---|---|
| obamas | obama |
| hilliary | hillary |

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of segregation of domain terms and noise terms from a set of non-dictionary terms. The embodiment, thus provides a method and system for correcting noise terms. Moreover, the embodiments herein further provides cleaning input data by replacing domain terms with corresponding corrected terms.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method of text cleaning, comprising:
    collecting data comprising a plurality of words as input data, via one or more hardware processors;
    classifying the plurality of words to a set of dictionary words (V) and a set of non-dictionary words (N), via the one or more hardware processors;
    determining a word frequency of each word in V and N, via the one or more hardware processors, wherein the word frequency of a word represents a frequency of an occurrence of the word in the input data;
    segregating the non-dictionary words in N as domain terms and noise terms, based on the determined word frequency, via the one or more hardware processors;
    classifying the plurality of words in V and N into a plurality of pre-defined categories, via the one or more hardware processors, wherein the plurality of pre-defined categories comprises a plurality of noise categories, a plurality of error categories and a plurality of non-error categories;
    determining correct term for each of a plurality of noise terms in the plurality of noise categories among the plurality of pre-defined categories, via the one or more hardware processors, wherein determining the correct term for each of the plurality of noise terms comprises:
        removing stop words from the input data to generate pre-processed data;
        determining context of the plurality of words by generating word embeddings of the plurality of words;
        generating character embedding of the plurality of words, wherein the character embedding of new words in the pre-processed data have at least partial overlap with known words with same root form in the pre-processed data;
        determining edit distance between the plurality of words;
        determining phoneme based distance between the plurality of words; and
        determining the correct term of each of the plurality of noise terms in N as a function of cosine similarity of the word embeddings, the character embedding, the determined edit distance, and the determined phoneme based distance;
    reclassifying the corrected terms, via the one or more hardware processors, wherein the reclassification of the corrected terms involves movement of the corrected terms from one category to another category among the plurality of pre-defined categories; and
    replacing the noise terms in the input data with the corresponding corrected terms, via the one or more hardware processors.

2. The processor implemented method as claimed in claim 1, wherein classifying the plurality of words in V and N into the plurality of pre-defined categories, comprises:
    classifying all of the plurality of words in V which fall in Jenk's class 1 as dictionary domain terms belonging to a first category of the plurality of categories;
    classifying all of the plurality of words in N which fall in Jenk's class 1 as non-dictionary domain terms belonging to a second category of the plurality of categories;
    determining each noise word identified as a distortion of a dictionary term as belonging to a third category of the plurality of categories; and
    determining each noise word identified as a distortion of a non-dictionary term as belonging to a fourth category of the plurality of categories.

3. The processor implemented method as claimed in claim 2, wherein reclassifying the corrected terms comprises iteratively performing the classification of the plurality of words into the plurality of categories and the movement of the corrected terms from one category to another category till no further movement of the corrected terms between the pre-defined categories is possible.

4. A system for document correction, comprising:
    a memory storing instructions;
    one or more communication interfaces; and
    one or more hardware processors coupled to the memory via the one or more communication interfaces, wherein the one or more hardware processors are configured by the instructions to:
        collect data comprising a plurality of words as input data;
        classify the plurality of words to a set of dictionary words (V) and a set of non-dictionary words (N);

determine a word frequency of each word in V and N, wherein the word frequency of a word represents a frequency of a occurrence of the word in the input data;

segregate the non-dictionary words in N as domain terms and noise terms, based on the determined word frequency;

classify the plurality of words in V and N into a plurality of pre-defined categories, wherein the plurality of pre-defined categories comprises a plurality of noise categories, a plurality of error categories and a plurality of non-error categories;

determine correct term for each of a plurality of noise terms in the plurality of noise categories among the plurality of pre-defined categories, wherein the system determines the correct term for each of the plurality of noise terms by:

removing stop words from the input data to generate pre-processed data;

determining context of the plurality of words by generating word embeddings of the plurality of words;

generating character embedding of the plurality of words, wherein the character embedding of new words in the pre-processed data have at least partial overlap with known words with same root form in the pre-processed data;

determining edit distance between the plurality of words;

determining phoneme based distance between the plurality of words; and determining the correct term of each of the plurality of noise terms in N as a function of cosine similarity of the word embeddings, the character embedding, the determined edit distance, and the determined phoneme based distance;

reclassify the corrected terms, wherein the reclassification of the corrected terms involves movement of the corrected terms from one category to another category among the plurality of pre-defined categories; and replace the noise terms in the input data with the corresponding corrected terms.

5. The system as claimed in claim 4, wherein the system classifies the plurality of words in V and N into the plurality of pre-defined categories by:

classifying all of the plurality of words in V which fall in Jenk's class 1 as dictionary domain terms belonging to a first category of the plurality of categories;

classifying all of the plurality of words in N which fall in Jenk's class 1 as non-dictionary domain terms belonging to a second category of the plurality of categories;

determining each noise word identified as a distortion of a dictionary term as belonging to a third category of the plurality of categories; and determining each noise word identified as a distortion of a non-dictionary term as belonging to a fourth category of the plurality of categories.

6. The system as claimed in claim 5, wherein the system reclassifies the corrected terms by iteratively performing the classification of the plurality of words into the plurality of categories and the movement of the corrected terms from one category to another category till no further movement of the corrected terms between the pre-defined categories is possible.

7. A non-transitory computer readable medium for document correction, wherein the non-transitory computer readable medium comprising a plurality of instructions, which when executed, cause:

collecting data comprising a plurality of words as input data, via one or more hardware processors;

classifying the plurality of words to a set of dictionary words (V) and a set of non-dictionary words (N), via the one or more hardware processors;

determining a word frequency of each word in V and N, via the one or more hardware processors, wherein the word frequency of a word represents a frequency of an occurrence of the word in the input data;

segregating the non-dictionary words in N as domain terms and noise terms, based on the determined word frequency, via the one or more hardware processors;

classifying the plurality of words in V and N into a plurality of pre-defined categories, via the one or more hardware processors, wherein the plurality of pre-defined categories comprises a plurality of noise categories, a plurality of error categories and a plurality of non-error categories;

determining correct term for each of a plurality of noise terms in the plurality of noise categories among the plurality of pre-defined categories, via the one or more hardware processors, wherein determining the correct term for each of the plurality of noise terms comprises:

removing stop words from the input data to generate pre-processed data;

determining context of the plurality of words by generating word embeddings of the plurality of words;

generating character embedding of the plurality of words, wherein the character embedding of new words in the pre-processed data have at least partial overlap with known words with same root form in the pre-processed data;

determining edit distance between the plurality of words;

determining phoneme based distance between the plurality of words; and determining the correct term of each of the plurality of noise terms in N as a function of cosine similarity of the word embeddings, the character embedding, the determined edit distance, and the determined phoneme based distance;

reclassifying the corrected terms, via the one or more hardware processors, wherein the reclassification of the corrected terms involves movement of the corrected terms from one category to another category among the plurality of pre-defined categories; and replacing the noise terms in the input data with the corresponding corrected terms, via the one or more hardware processors.

8. The non-transitory computer readable medium as claimed in claim 7, wherein the non-transitory computer readable medium causes classification of the plurality of words in V and N into the plurality of pre-defined categories, by:

classifying all of the plurality of words in V which fall in Jenk's class 1 as dictionary domain terms belonging to a first category of the plurality of categories;

classifying all of the plurality of words in N which fall in Jenk's class 1 as non-dictionary domain terms belonging to a second category of the plurality of categories;

determining each noise word identified as a distortion of a dictionary term as belonging to a third category of the plurality of categories; and determining each noise word identified as a distortion of a non-dictionary term as belonging to a fourth category of the plurality of categories.

9. The non-transitory computer readable medium as claimed in claim 8, wherein the non-transitory computer readable medium causes reclassification of the corrected terms by iteratively performing the classification of the plurality of words into the plurality of categories and the movement of the corrected terms from one category to another category till no further movement of the corrected terms between the pre-defined categories is possible.

\* \* \* \* \*